United States Patent
Tidona

(10) Patent No.: US 10,660,283 B2
(45) Date of Patent: May 26, 2020

(54) COLUMN ELEMENTS FOR A DEVICE FOR THE VERTICAL CULTIVATION OF PLANTS

(71) Applicant: Manticore IT GmbH, Heidelberg (DE)

(72) Inventor: Marco Tidona, Heidelberg (DE)

(73) Assignee: APONIX GMBH, Heidelberg (DE)

( * ) Notice: Subject to any disclaimer, the term of this patent is extended or adjusted under 35 U.S.C. 154(b) by 162 days.

(21) Appl. No.: 15/563,552

(22) PCT Filed: Mar. 29, 2016

(86) PCT No.: PCT/EP2016/056826
§ 371 (c)(1),
(2) Date: Sep. 29, 2017

(87) PCT Pub. No.: WO2016/156334
PCT Pub. Date: Oct. 6, 2016

(65) Prior Publication Data
US 2018/0084744 A1    Mar. 29, 2018

(30) Foreign Application Priority Data

Mar. 31, 2015  (DE) .................. 10 2015 004 112

(51) Int. Cl.
*A01G 31/06*  (2006.01)
*A01G 9/02*  (2018.01)
*A01G 31/02*  (2006.01)

(52) U.S. Cl.
CPC ............ *A01G 31/06* (2013.01); *A01G 9/022* (2013.01); *A01G 9/023* (2013.01); *A01G 31/02* (2013.01); *Y02P 60/216* (2015.11)

(58) Field of Classification Search
CPC ........ A01G 31/00; A01G 31/02; A01G 31/06; A01G 9/022; A01G 9/023; A01G 9/024

(Continued)

(56) References Cited

U.S. PATENT DOCUMENTS 4,614,056 A * 9/1986 Farkas .................. A01G 9/023
47/67
4,622,777 A * 11/1986 Greene, Jr. ............ A01G 9/022
47/67

(Continued)

FOREIGN PATENT DOCUMENTS

CN      102300453 A    12/2011
CN      102461425 A    5/2012

(Continued)

OTHER PUBLICATIONS

English language translation of the International Preliminary Report on Patentability—Chapter I including the Written Opinion of the International Searching Authority for International Patent Application No. PCT/EP2016/056826 dated Oct. 3, 2017; 8 pages.

(Continued)

*Primary Examiner* — Christopher D Hutchens
(74) *Attorney, Agent, or Firm* — Dean W. Amburn; Giroux Amburn PC

(57) ABSTRACT

A modularly constructed column element is proposed for the vertical cultivation of plants which are nourished by wetting the roots with an aqueous nutrient solution, the individual parts of said column element being able to be stacked in a space-saving manner and transported, assembled, disassembled and cleaned very easily.
The modular structure of the column element includes a lid part, a base part and at least one wall ring between the lid part and the base part. The wall ring is composed of a plurality of ring segments, in which the planting openings are formed, in which plants can be positioned such that their roots grow into the interior of the column element. The lid part is arranged on the end side on the uppermost wall ring and the base part is arranged on the end side on the lowermost wall ring.

11 Claims, 6 Drawing Sheets

(58) Field of Classification Search
USPC .................. 47/39, 60, 65.7, 66.5, 82, 83, 86
See application file for complete search history.

(56) References Cited

U.S. PATENT DOCUMENTS

| | | | | |
|---|---|---|---|---|
| 4,920,695 | A * | 5/1990 | Garden | A01G 9/022 47/67 |
| 5,276,997 | A * | 1/1994 | Swearengin | A01G 9/022 47/48.5 |
| 5,428,922 | A * | 7/1995 | Johnson | A01G 9/023 47/62 R |
| 6,269,589 | B1 * | 8/2001 | Bouler | A01G 9/023 47/65.5 |
| 7,080,482 | B1 * | 7/2006 | Bradley | A01G 31/02 47/60 |
| 2003/0089037 | A1 * | 5/2003 | Ware | A01G 31/02 47/83 |
| 2000/6032128 | | 2/2006 | Morris, III | |
| 2012/0000128 | A1 | 1/2012 | Rochefort | |
| 2012/0117871 | A1 * | 5/2012 | Luckett | A01G 9/023 47/65.7 |
| 2013/0145689 | A1 * | 6/2013 | Luurtsema | A47G 7/047 47/65.7 |
| 2013/0152468 | A1 * | 6/2013 | Huang | A01G 9/022 47/82 |
| 2014/0000162 | A1 | 1/2014 | Blank | |
| 2015/0223418 | A1 * | 8/2015 | Collins | A01G 31/02 47/62 R |
| 2015/0334930 | A1 * | 11/2015 | Stoltzfus | A01G 31/06 47/62 A |
| 2016/0050863 | A1 * | 2/2016 | Graber | A01G 31/02 47/62 R |
| 2017/0105372 | A1 * | 4/2017 | Bryan, III | A01G 31/06 |
| 2018/0220593 | A1 * | 8/2018 | Cudmore | C05F 17/0276 |
| 2018/0263201 | A1 * | 9/2018 | Linneberg | A01G 9/022 |
| 2019/0082606 | A1 * | 3/2019 | Moffitt | A01G 22/00 |

FOREIGN PATENT DOCUMENTS

| | | |
|---|---|---|
| CN | 202819215 U | 3/2013 |
| CN | 52642858 U | 8/2013 |
| WO | WO 2010/102405 A1 | 9/2010 |
| WO | WO2011145619 A1 | 11/2011 |

OTHER PUBLICATIONS

International Search Report for International Patent Application No. PCT/EP2016/056826 completed Jun. 6, 2016 and dated Jul. 6, 2016; 2 pages.
English language abstract of WIPO Patent Publication No. WO 2011145619 A1; 3 pages.
English language of Chinese Patent Publication No. CN 102300453 A; 21 pages.
English language of Chinese Patent Publication No. CN 102461425 A; 11 pages.
English language of Chinese Patent Publication No. CN 203105258 U; 10 pages.
English language abstract of Chinese Patent Publication No. CN 202819215 U; 11 pages.
Office Action, dated Dec. 2, 2019, of the parallel Chinese application, which cites the prior art references in a table on pp. 6 and 7; 8 pages.

* cited by examiner

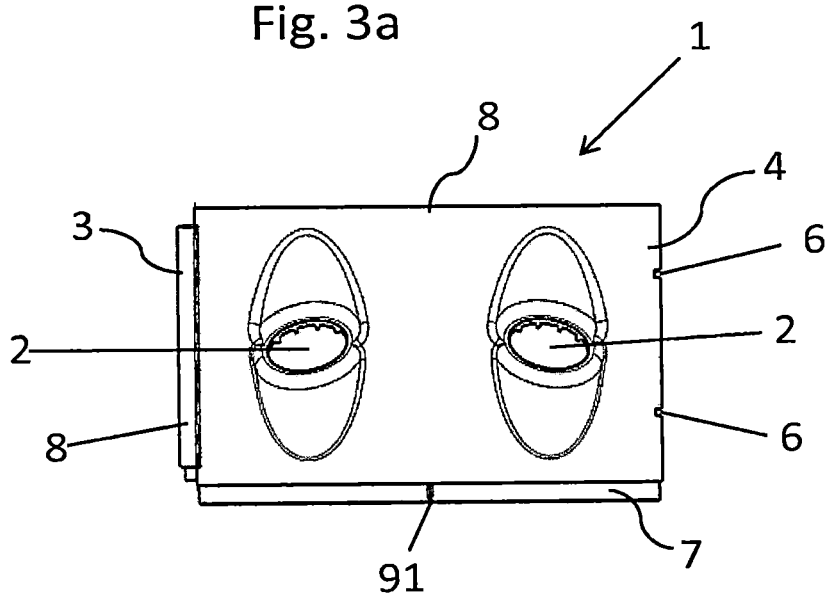
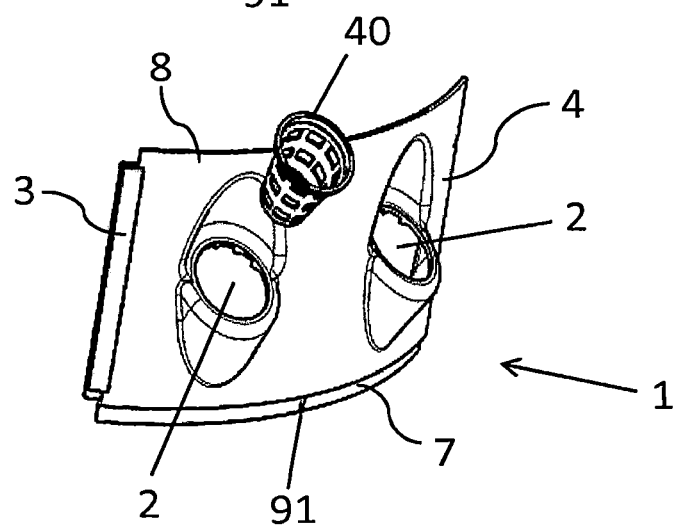

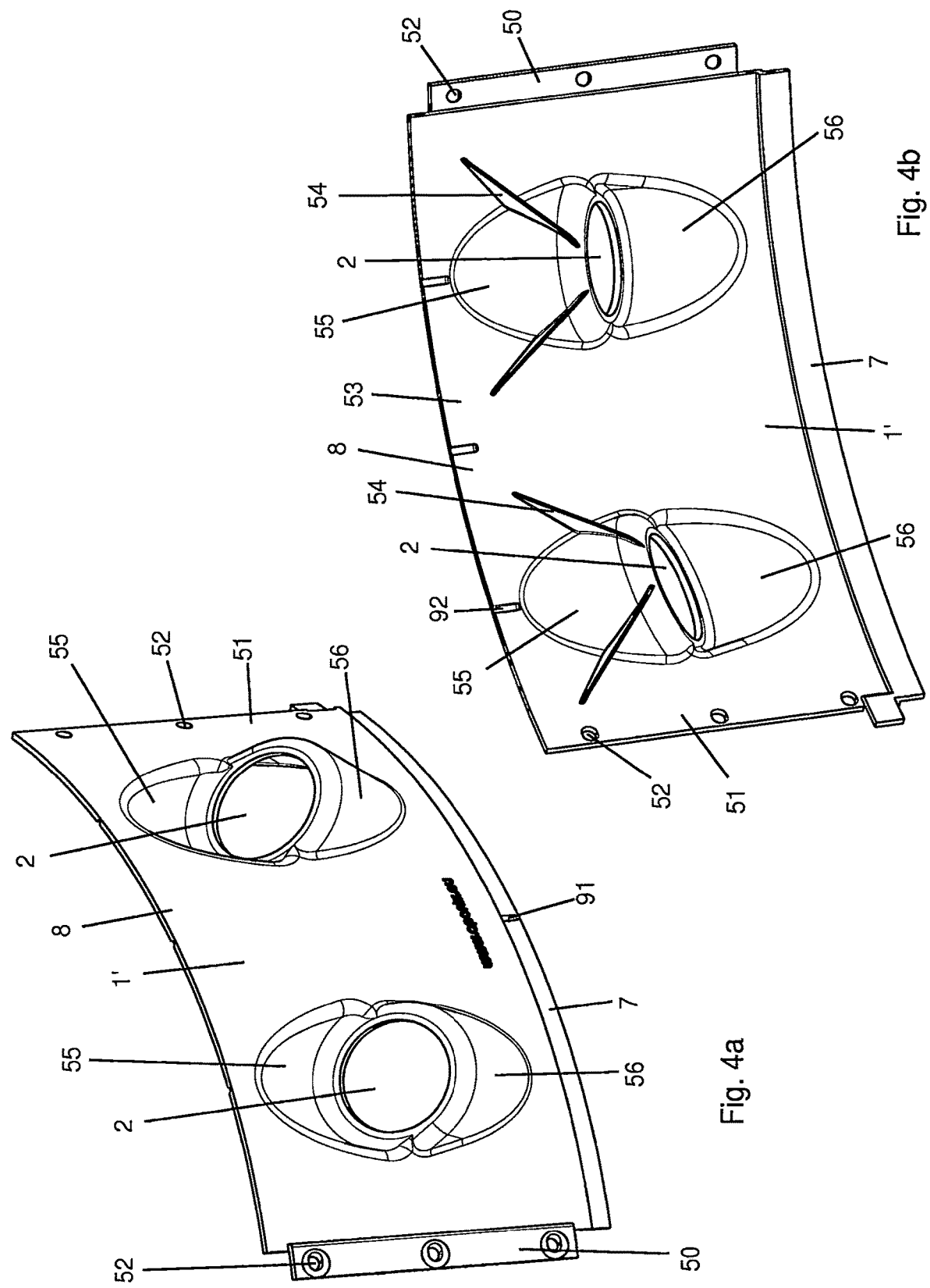

COLUMN ELEMENTS FOR A DEVICE FOR THE VERTICAL CULTIVATION OF PLANTS

CROSS-REFERENCE TO RELATED APPLICATIONS

This application is the National Stage of International Patent Application No. PCT/EP2016/056826 filed on Oct. 6, 2016, and German Patent Application No. DE 10 2015 004 112.6 filed on Mar. 31, 2015, the entire contents of which are hereby incorporated by reference.

TECHNICAL FIELD

The invention relates generally to devices for the vertical cultivation of plants which are nourished by wetting the roots with an aqueous nutrient solution. The solution can be in particular a mineral nutrient solution (hydroponics) or an organic nutrient solution (aquaponics).

The starting point of the present invention is a modularly constructed column element for such a device. Formed in the column wall are a plurality of planting openings, in which plants can be positioned in such a manner that their roots grow into the interior of the column element where they are wetted with nutrient solution.

BACKGROUND

The vertical cultivation of plants is gaining increasing significance, in particular in the domain of "urban farming". Since the available horizontal areas are generally very limited, there is an attempt to increase the yield by using planting containers which permit vertical cultivation. In the case of aeroponics plant systems, the plants are thus fixed in dedicated planting openings of the planting container in such a way that their roots grow into the interior of the planting container where they are wetted with an aerosol of a nutrient solution. This aerosol can be produced e.g. with the aid of nebulisation or sprinkler nozzles in the planting container. In the case of a hydroponics plant system, the plants are rooted in an inorganic substrate which serves merely to hold the plants. In this case, the roots are wetted with nutrient solution via the substrate. Both cultivation methods bring about strong root growth which contributes to an acceleration of the ripening process and results in a high yield.

Various devices and planting containers for the vertical cultivation of plants are known from practice, such as tower-like devices comprising a plurality of circumferential planting tubs arranged one above the other, or even planting walls comprising planting openings, arranged in the manner of a grid, in the wall surfaces.

These known devices consist mostly of a plurality of relatively large and bulky individual parts, the transportation and assembly of which are associated with a comparatively large outlay. Accordingly, these devices are designed generally for a specific usage site where they are constructed once and fixedly installed.

U.S. Patent Application Publication No. 2014/0000162 A1 describes a device for the vertical cultivation of plants which are nourished by wetting the roots with an aqueous nutrient solution. This device comprises a plurality of modularly constructed column elements, the walls of which having planting openings formed therein. The column elements are suspended from a frame in a grid-like arrangement next to one another and one behind the other. Furthermore, this device comprises, for each column element, a supply line which is connected to the upper end of the column element and leads into the column interior, a drain line which is connected to the lower end of the column, a collecting vessel for the nutrient solution which is connected both to the supply line and to the drain line, and a central pumping device, by means of which the nutrient solution is pumped from the collecting vessel via the supply lines into the column interior.

The column element described in U.S. Patent Application Publication No. 2014/0000162 A1 is composed of a plurality of similar planting pots. Each planting pot consists of a circular base plate, a cylindrical wall and a tube portion which extends from the centre of the base plate to the upper edge of the planting pot. The planting openings are formed as protrusions in the upper edge region of the cylindrical wall of the individual planting pots. The planting pots of a column element are attached onto one another such that the tube portions form a central tube which extends over the entire height of the column element. Moreover, the lower edge region of the cylindrical wall or the base plate of each planting pot is provided with a circumferential groove which serves as a retainer for the upper edge region of an adjoining planting pot. Through-going holes for drainage are formed in the base plates of the planting pots so that the nutrient solution can run or drip through the entire column element, i.e. from the uppermost planting pot to the lowermost planting pot and as far as into the collecting vessel.

The structural concept described in U.S. Patent Application Publication No. 2014/0000162 A1 allows column elements of different heights to be produced by varying the number of the structurally identical planting pots mounted one on top of the other. In this manner, the known column elements can also be adapted easily to the particular aspects of the respective installation site.

However, the planting pots described in U.S. Patent Application Publication No. 2014/0000162 A1 have a relatively complicated three-dimensional form. The production thereof is correspondingly expensive. Moreover, the individual planting pots occupy a very large volume when being both transported and stored because they cannot be placed together or stacked in a space-saving manner. Re-use of the planting pots as part of another installation is generally not provided because it proves to be problematic to clean said pots after use and disassemble of a column element by reason of the complicated three-dimensional form.

SUMMARY

The present invention proposes a modularly constructed column element for vertical cultivation of plants, the individual parts of which can be stacked in a space-saving manner and can be transported, assembled, disassembled and cleaned very easily. Formed in the column wall are a plurality of planting openings, in which plants can be positioned in such a manner that their roots grow into the interior of the column element where they are wetted with nutrient solution.

In accordance with the invention, the modular structure of the column element comprises a lid part, a base part and at least one wall ring between the lid part and the base part. Each wall ring is composed of a plurality of ring segments, in which the planting openings are formed. The lid part is arranged on the end side on the uppermost wall ring and the base part is arranged on the end side on the lowermost wall ring. This structure of the column element is fixed and stabilized with the aid of tensioning elements which are tensioned on the outer side of the column element between the lid part and the base part.

Accordingly, the height of the claimed column element can be varied by the number of wall rings. It is essential to the invention that these wall rings are composed of a plurality of ring segments. All of the individual parts of a column element can be fitted together. In accordance with the invention, these plug connections are fixed and stabilize by means of tensioning elements on the outer side of the column element between the lid part and the base part to such an extent that the column element can be installed and planted at its usage site and can also support the constantly increasing biomass of the growing plants. As a result, the individual parts of the column element and in particular the connection regions can be configured in structural terms very simply. This also permits optimisation of the individual parts with regard to simple and cost-effective manufacture, ease of cleaning for re-use of individual parts and stacking capability. Furthermore, the column element can be rotated, e.g. in order to illuminate the plants uniformly. In the case of a suspended arrangement, the entire column element can be rotated e.g. by means of a rotary hook in the suspension. In the case of a standing arrangement, e.g. the wall rings can be rotated relative to the stand.

Basically, there are many different ways of producing a column element in accordance with the invention, both as far as the number of wall rings and the number of ring segments of a wall ring are concerned and also with regard to the dimensions and form of the individual parts—lid part, base part and ring segments. The type of planting and the spatial conditions of the installation site will always also play a role.

Normally, the structure of a planting column in accordance with the invention will comprise a plurality of wall rings. The wall rings can be circular. Further, in order to increase the stability of the structure it is recommended to arrange the ring segments of the mutually adjoining wall rings in an offset manner with respect to one another so that the ring segments arranged one above the other are laterally interlocked with one another.

In one advantageous embodiment of the invention, provision is made that the ring segments of the wall ring are fitted together. Such a configuration can be produced cost-effectively and constructed rapidly. Fitting together can be effected easily particularly when the ring segments are provided with a tongue and groove. Fitting together can also be effected by the connection means described below which are inserted through holes in the ring segments.

Preferably, provision is made that the lid part has at least one connection for a supply line.

Preferably, provision is made that the base part has at least one connection for a drain line.

In an advantageous manner, provision is made that the lid part is mounted on the uppermost wall ring. It is also advantageous if the base part is mounted on the lowermost wall ring.

In a non-limiting preferred embodiment of the invention, all of the ring segments of the wall rings have the same geometric dimensions and are structurally identical. Depending upon the column diameter, e.g. four, six or eight ring segments can be provided, but it is also possible to have an odd number of ring segments. In the case of structurally identical ring segments and an offset arrangement of the ring segments of mutually adjoining wall rings, a vertically offset arrangement of the planting openings can be achieved very easily so that the surface of the column wall can be utilized in an optimum manner by the plants. Moreover, structurally identical ring segments can be manufactured very cost-effectively.

If the lid part and the base part of the column element in accordance with the invention both form an end-side column termination with connection opening for the supply circuit, these two individual parts of the column element can also be structurally identical. This not only contributes to a reduction in manufacturing costs, it also allows the lid part and base part to be stacked in a space-saving manner during storage and transportation. Moreover, assembly of the column element is also simplified as a result.

In a further advantageous embodiment of the invention, provision is made that the ring segments each have a lateral edge region and that the ring segments are connected to one another in the lateral edge regions. In this way, a stable construction can be achieved with a small amount of outlay.

Preferably, the lateral edge regions of two adjacent ring segments are arranged in an overlapping manner and have holes, through which connection means, which fix the ring segments to one another, extend. In this way, the ring segments can be fitted together quickly and reliably. It is particularly preferred if the connections means comprise rivets.

The nutrient solution is introduced at the upper end of the column element as an aerosol or in droplet form into the column interior via one or a plurality of connection openings, then settles on the inner wall and the roots in the column interior and finally flows downwards to the base part by reason of gravitational force, where it is guided via at least one drain line out of the column element and into a collecting vessel which is also designated as a sump. Therefore, the plug connection between the ring segments of a wall ring should be configured such that where possible the nutrient solution cannot readily escape out of the connection region. However, the plug connection does not need to be one hundred percent water-tight or pressure-tight.

These conditions are met e.g. by a grooved and tongued connection between the individual ring segments if one lateral edge of the ring segments serves as a tongue element, whilst the other lateral edge of the ring segments is formed as a receiving groove. Such ring segments can be manufactured very easily and in this case it is also extremely easy to join said ring segments together to form a wall ring.

In particular, during assembly of the column elements it proves to be advantageous if the ring segments of a wall ring cannot readily be displaced vertically against one another so that the wall ring as a whole can be attached to the structure of the column element. Therefore, in one embodiment of the invention, pin-like projections are formed in the edge region of the ring segments, said projections engaging into corresponding recesses in the edge region of an adjacent ring segment so that the ring segments of a wall ring are fixed with respect to one another in the vertical direction.

The plug connections between the individual wall rings of a column element should also be configured in such a way that where possible the nutrient solution cannot escape out of the connection region. In one advantageous embodiment of the invention, this is easily achieved by virtue of the fact that the lower edge of the ring segments is stepped back with respect to its curved wall surface so that, when two wall rings are being fitted together, the lower edge of the upper wall ring engages behind the wall of the lower wall ring.

As already mentioned, the ring segments of wall rings, attached one on top of the other, are arranged preferably in an offset manner with respect to one another. In this connection, it proves to be advantageous if the ring segments are equipped with adjusting or positioning aids. They can be produced in the form of bead-like projections and corresponding grooves in the upper and lower edge region of the ring segments.

In one advantageous embodiment of the invention, provision is made that a guiding device which guides the aqueous nutrient solution to the planting opening is provided on an inner wall of the ring segment. In this manner, the plants can be supplied in a particularly effective manner with water or nutrient solution. Preferably, guiding devices are provided on all ring segments. In a particularly preferred manner, one guiding device is provided for each planting opening.

In one development of this inventive concept, provision is made that the guiding device comprises projections which extend inwardly from an inner wall of the ring segment. The projections can guide water or nutrient solution, which runs down on the inner side of the column element, to the planting opening. Therefore, roots of plants which are inserted into the planting opening can be effectively watered and supplied with nutrients. It is sufficient to apply water to the inner wall in the upper region, which can occur e.g. by spraying. By reason of gravitational force, the water then runs downwards and is guided by the projections to the planting openings. Preferably, the projections are formed as wings.

In an advantageous manner, provision is made that the ring segment has a holder for a plant, wherein the holder comprises a first wall portion pointing obliquely inwards, and a second wall portion pointing obliquely outwards, wherein the planting opening is arranged between the first and second wall portions. In this way, the plants can be arranged obliquely, wherein the roots can extend into the interior of the planting vessel.

In a particularly advantageous manner, provision can be made that the guiding device is arranged on the inner side of the first wall portion. In this manner, water can be guided particularly easily and efficiently to the planting openings.

The structural concept in accordance with the invention also renders it possible to produce very tall column elements, i.e. column elements with a height greater than 5 m. In order to ensure adequate wetting of the plant roots in the lower column region of such tall column elements, a plurality of nebulisation or atomiser and/or sprinkler nozzles are arranged in the column interior distributed over the height of the column element and are supplied with nutrient solution by the supply line. For this purpose, the supply line can be connected e.g. to a tube line, which is positioned centrally in the column interior and has corresponding nozzles, or even to a spiral-shaped line which is guided along the inner wall of the column element and is equipped with corresponding nozzles.

BRIEF DESCRIPTION OF THE DRAWINGS

As already explained above, there are various ways of embodying and developing the teaching of the present invention in an advantageous manner. For this purpose, reference is made, on the one hand, to the dependent claims and, on the other hand, to the following description of an exemplified embodiment of the invention with reference to the figures.

FIGS. 3a, 3b show a plan view and a perspective view of such a ring segment 1;

FIGS. 4a, 4b show perspective views from outside and inside of a ring segment 1' according to a further embodiment;

DETAILED DESCRIPTION

Figure 1:
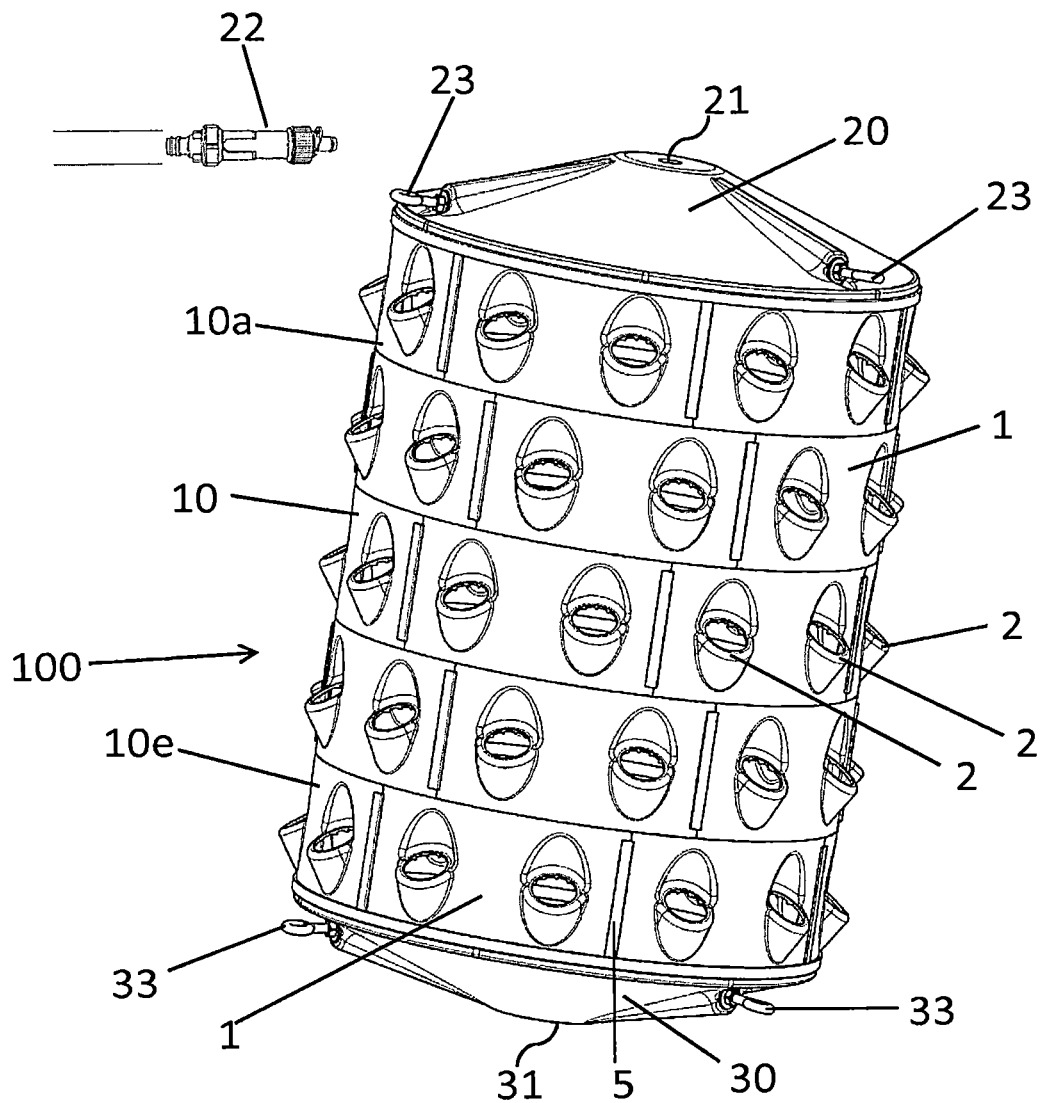
FIG. 1 shows a perspective view of a column element 100 in accordance with the invention comprising five wall rings 10.
Figure 2:
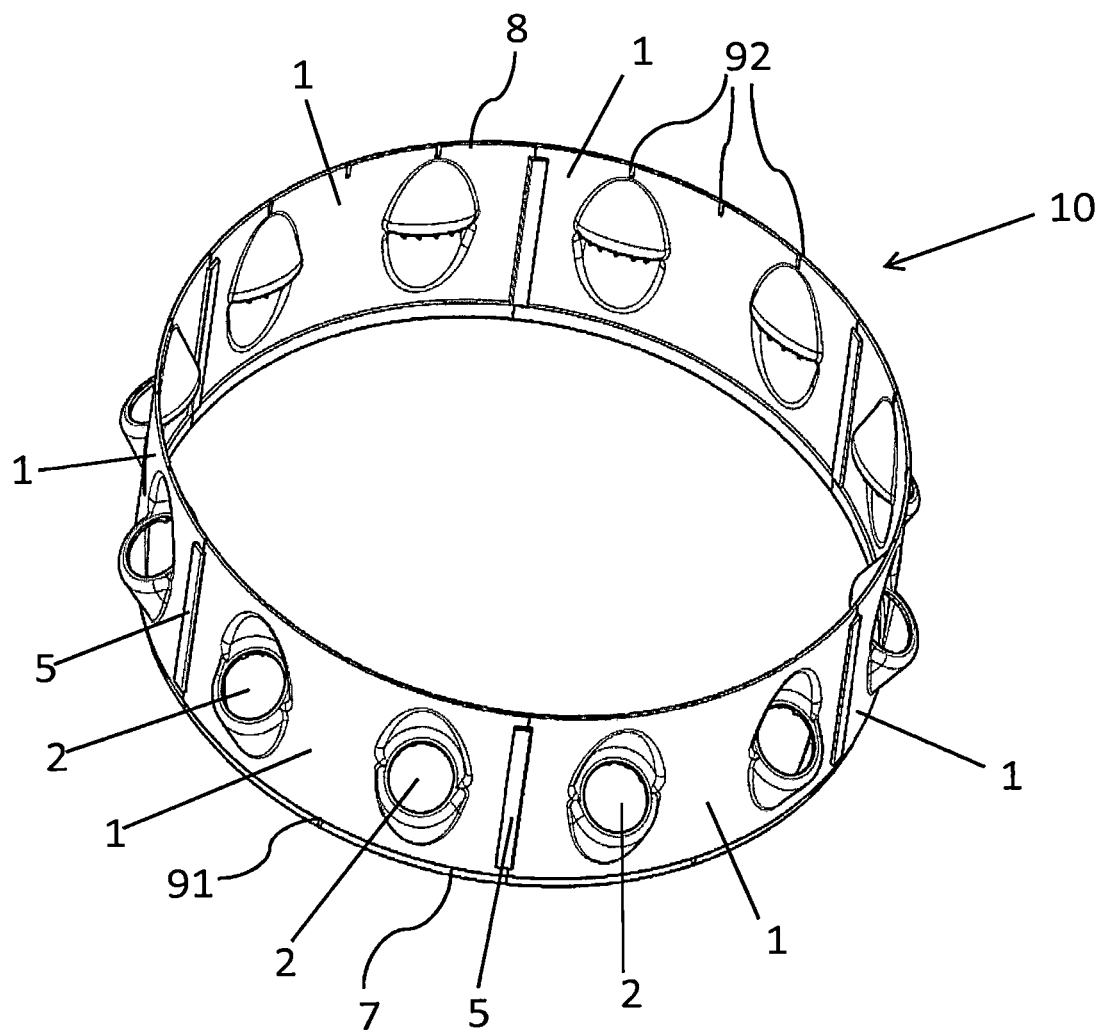
FIG. 2 shows a perspective view of such a wall ring 10 which is composed of six ring segments 1.

The column element 100 illustrated in FIG. 1 is used for the vertical cultivation of plants which are nourished by wetting the roots with an aqueous nutrient solution. The column element 100 is modularly constructed and comprises a lid part 20, a base part 30 and five uniform wall rings 10 between the lid part 20 and the base part 30. In the exemplified embodiment described in this case, each wall ring 10 consists of six structurally identical ring segments 1, in which two planting openings 2 are formed in each case. This is also illustrated once again by FIG. 2. The height of the column element 100 and thus the number of available planting openings 2 can be flexibly adapted to the respective available space by the number of wall rings 10.

The planting openings 2 are designed in this case as holders for net pots 40 which can be inserted into the planting openings 2 from the outside in an oblique manner with respect to the column axis, which is illustrated in particular by FIG. 3b. The slips or seedlings are fixed in the net pots 40 either with the aid of an inorganic substrate or even simply only with the aid of clamps, so-called grow-grips. The roots then grow through the respective net pot 40 and hang freely in the interior of the column element 100 where they are supplied with nutrient solution and oxygen until harvested. For this purpose, an aerosol of the nutrient solution is produced in the interior of the column element so that the roots can be wetted on all sides, where possible. This nourishing method initially favours root growth and then also the growth and the ripening process of the plants overall with the spaced intervals between plants being comparatively small. For harvesting purposes, the plant can simply be removed together with the net pot 40 from the planting opening 2 of the column element 100.

The ring segments 1 of a wall ring 10 are fitted together and also the wall rings 10 of the column element 100 are fitted to one another. This type of plug connection and the configuration of the lateral, upper and lower edge regions of the ring segments 1 are explained in greater detail with reference to FIGS. 3a and 3b.

The lid part 20 is attached on the end side to the uppermost wall ring 10a, and the base part 30 is attached on the end side to the lowermost wall ring 10e. In the exemplified embodiment illustrated in this case, the lid part 20 and the base part 30 are structurally identical. These two parts 20 and 30 are conically formed and have a central connection opening 21 or 31, by means of which the column element 100 is connected to a supply circuit for the nutrient solution. For this purpose, the supply line is coupled to the connection opening 21 of the lid part 20 e.g. via a click connection 22, as used for garden hoses. In the case of column elements up to about 2 m in height, the nebulisation or sprinkler nozzles for producing the aerosol are located in the region of the lid part. In the case of taller column elements, it is recommended to distribute the nozzles over the height of the column inner space so that the plants in the lower region of the column element are also adequately supplied with nutrient solution. For this purpose, e.g. a central tube line can be arranged within the column element and is equipped with a nozzle arrangement distributed over the entire height of the column element.

The nutrient solution accumulates in the funnel-shaped base part 30 after it has been deposited on the inner wall and the roots and has passed through the column element 100. The connection 31 for the drain line of the nutrient solution is arranged here and can likewise be easily produced in the form of a click-connection.

Three ring hooks 23 and 33 which are used as fastening and guiding eyelets for tensioning elements are each attached in the edge region of the lid part 20 and of the base part 30. They are tensioned on the outer side of the column element 100 between the lid part 20 and the base part 30 in order to fix and stabilize the structure of the column element 100. The tensioning elements which can be used are e.g. ribbon cables or nylon cables.

The planting openings 2 of a wall ring 10 of the column element illustrated in FIG. 1 are always arranged offset with respect to the planting openings 2 of the adjacent wall rings 10 so that the plants have as much space as possible to flower out and for exposure to light and air. For this purpose, the individual wall rings 10 have been attached to one another such that the ring segments 1 of the mutually adjoining wall rings 10 are arranged offset with respect to one another.

FIG. 3*a* shows a plan view of a ring segment 1 comprising two planting openings 2 for accommodating net pots 40. The perspective view of FIG. 3*b* illustrates the curvature of the ring segment 1. The left edge region of the ring segment 1 is configured as a receiving groove 3, whereas the right edge region 4 has the same wall thickness as the central region of the ring segment 1. The receiving groove 3 of the left edge region is designed such that it can be easily attached to the right edge region 4 of an adjoining ring segment 1. This produces a grooved and tongued connection 5 between the two ring segments 1, wherein the right edge region 4 of one ring segment 1 functions as a tongue element 4. Formed inside the receiving groove 3 are pin-like projections which, however, cannot be seen here. When fitting together two ring segments 1, the projections engage into corresponding recesses 6 in the right edge region of the adjacent ring segment 1 so that the ring segments 1 of a wall ring 10 are fixed with respect to one another in the vertical direction.

The lower edge 7 of the ring segment 1 is stepped back with respect to its curved wall surface so that when fitting together two wall rings 10 the lower edge 7 of the upper wall ring engages behind the wall of the lower wall ring. The lower edge region 7 and the upper edge region 8 of the ring segment 1 are equipped with adjusting or positioning aids for attaching the wall rings 10 to one another, said aids ensuring that the ring segments 1 of the mutually adjoining wall rings 10 are arranged offset with respect to one another. In this case, these adjusting and positioning aids are produced in the form of a bead-like projection 91 on the outer side of the lower edge region and a corresponding groove 92 on the inner side of the upper edge region 8 which can be seen in particular in FIG. 2. When attaching the wall rings 10 to one another, namely the bead-like projections 91 in the lower edge region 7 of the ring segments 1 are to always engage into a corresponding groove 92 in the upper edge region 8 of the adjoining ring segments 1.

All of the individual parts of the column element described in this case, namely the structurally identical lid and base parts 20 and 30 and the structurally identical ring segments 1, are preferably manufactured from a robust synthetic material which is preferably heat-resistant and weather-resistant. The synthetic material should also be impervious to light and be UV-resistant. It should also be shock-proof, break-proof and preferably dimensionally stable. Injection-moulding technology is a suitable manufacturing procedure.

With regard to uniformly illuminating the plants by sunlight or artificial light, it is advantageous if the column element in accordance with the invention is rotatably mounted. For this purpose, it can be suspended from a corresponding holder and/or can also be provided with a stand.

The column element in accordance with the invention can be operated within greenhouses, under a canopy or even in the outdoors as an individual planting column or even as part of a device for the vertical cultivation of plants which comprises a multiplicity of column elements of the same or even different design. The only prerequisite is a hydroponics or aeroponics circuit system for supplying the plants with nutrient solution, to which the column element can be connected. It should also be mentioned that the column element in accordance with the invention can be used in conjunction with an aquaponics system, by means of which the nutrient solution for the plants is produced ecologically with the aid of fish which are supplied with protein-containing food.

In any event, the modular structure of the column element in accordance with the invention provides the option of making the height of the column element and thus also the number of planting spaces very flexible in order to utilise the available utility space and the local conditions in the most efficient manner possible in terms of yield. Moreover, the column elements in accordance with the invention not only can be constructed and installed very easily, they can also be disassembled, easily cleaned, stored in a space-saving manner and transported cost-effectively in order to be newly designed and constructed at another location. For instance, the column elements in accordance with the invention can be used all year round or even only seasonally.

FIGS. 4*a* and 4*b* show a further embodiment of a ring segment 1'. The ring segment 1' is formed in a similar manner to the ring segment 1. Reference is made to the description above which applies accordingly where there is correspondence. FIG. 4*a* shows the outer side of the ring segment 1'.

The ring segment 1' has a curved form. Again, planting openings 2 are provided in the ring segment 1'. In the illustrated exemplified embodiment, the ring segment 1' has two planting openings 2.

Figure 5B:
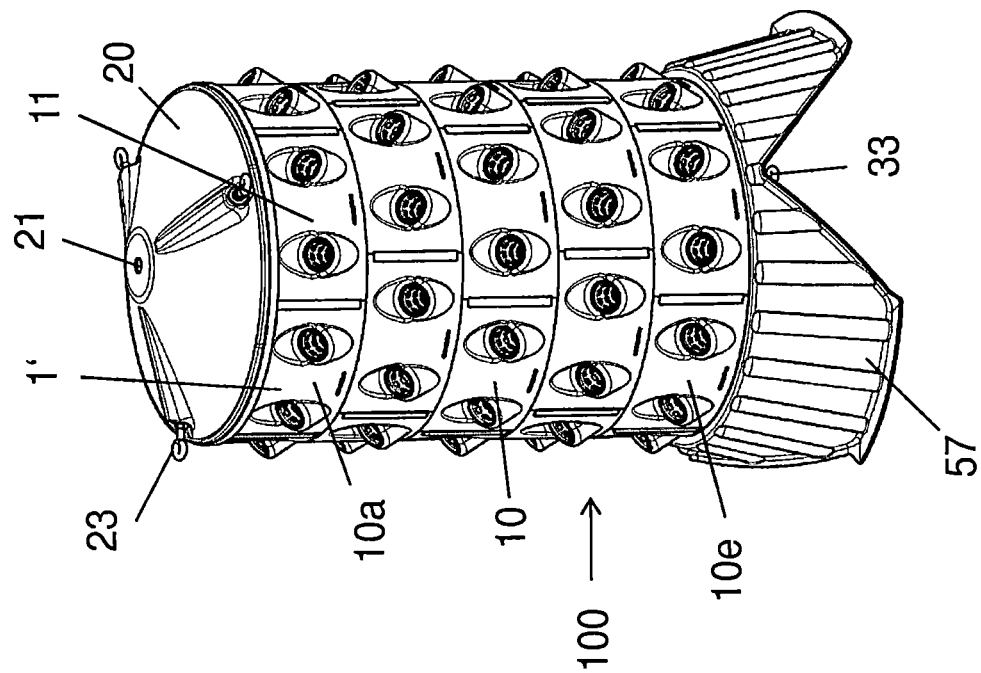
FIGS. 5a, 5b, 5c show a side view, a perspective view and a cross-section of a further embodiment of a column element in accordance with the invention.
Figure 5A:
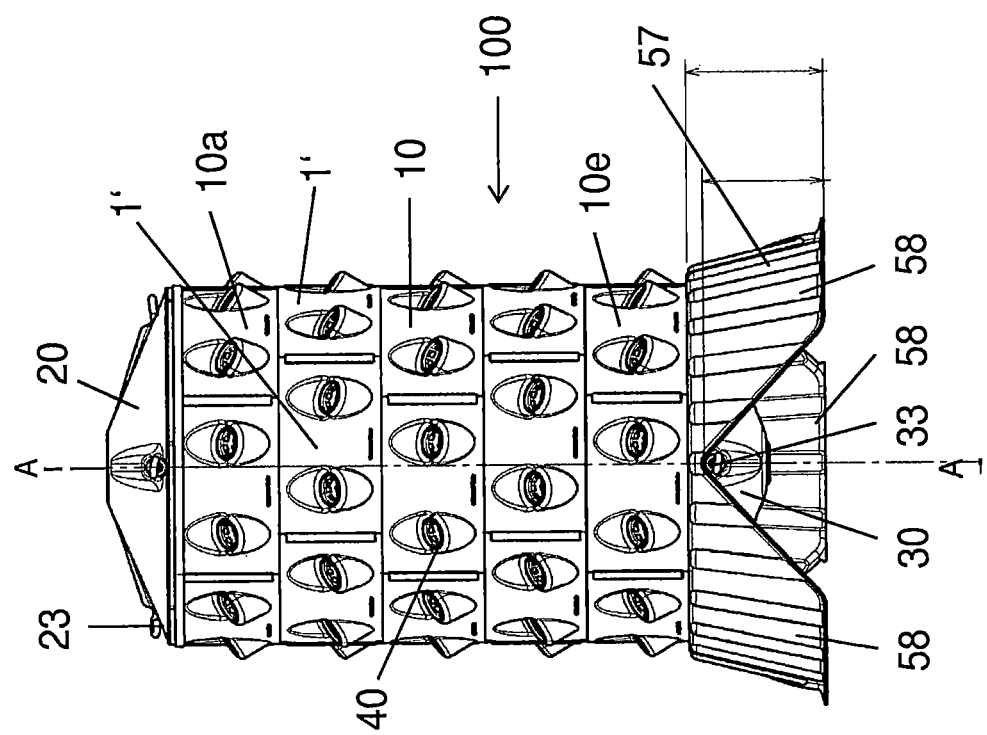

The ring segment 1' is formed such that a wall ring 10 can be composed of a plurality of ring segments 1' (cf. also FIG. 5*a*). The ring segments 1' have lateral edge regions 50 and 51. One of the ring segments 1' can be connected in the edge region 50 to the edge region 51 of the adjacent ring segment. For this purpose, in the assembled state the lateral edge regions 50, 51 of two adjacent ring segments 1' are arranged in an overlapping manner. In this respect, FIG. 4*a* shows that the edge region 50 is arranged slightly further outwards in the radial direction than the edge region 51. The edge regions 50, 51 each have holes 52. In the illustrated exemplified embodiment, the lateral edge region 51 has three holes 52 and the lateral edge region 50 likewise has three holes 52. The holes 52 of the edge regions 50 and 51 are arranged such that they can be aligned with one another. The ring segment 1' can be connected to an adjacent ring segment 1' by means of fastening means which extend through the holes 52. The fastening means can be formed in particular as rivets. In this way, a wall ring 10 can be composed of a plurality of identically formed ring segments 1' and can be connected in a stable manner.

The ring segment 1' has a lower edge 7 which is formed like that of the ring segment 1. Reference is made thereto.

FIG. 4b shows the inner side of the ring segment 1'. In this case, it can clearly be seen that a guiding device 54 which guides aqueous nutrient solutions to the planting opening 2 is provided on the inner wall 53 of the ring segment 1'. In the illustrated exemplified embodiment, each of the planting openings 2 is provided with a guiding device 54.

FIGS. 4a and 4b also show that the edge of the planting openings 2 is formed in a smooth manner.

The guiding device 54 comprises projections which extend inwardly from the inner wall 53 of the ring segment 1'. The projections are formed as wings. In the illustrated exemplified embodiment, two projections arranged in a V-shape are provided for a planting opening 2. Water which is applied to and runs down the inner wall is guided by the projections to the planting opening 2 under the effect of gravitational force.

FIGS. 4a and 4b also clearly show that the ring segment 1' has a holder for plants, wherein the holder has a first wall portion 55 which points obliquely inwards. Furthermore, the holder comprises a second wall portion 56 which points obliquely outwards. The planting opening 2 is arranged between the first and second wall portions 55, 56. As can be clearly seen in FIG. 4b, the guiding device 54 is arranged on the inner side of the first wall portion 55.

FIG. 5a shows a side view of a column element 100 which is modularly constructed from the ring segments 1'. In the illustrated exemplified embodiment, the column element 100 comprises five wall rings 10. In the illustrated exemplified embodiment, each wall ring 10 is composed of six ring segments 1'. The ring segments 1' are connected to one another by means of rivets, not illustrated, in the manner described above.

FIG. 5b shows a perspective view of the column element 100 of FIG. 5a.

Figure 5C:
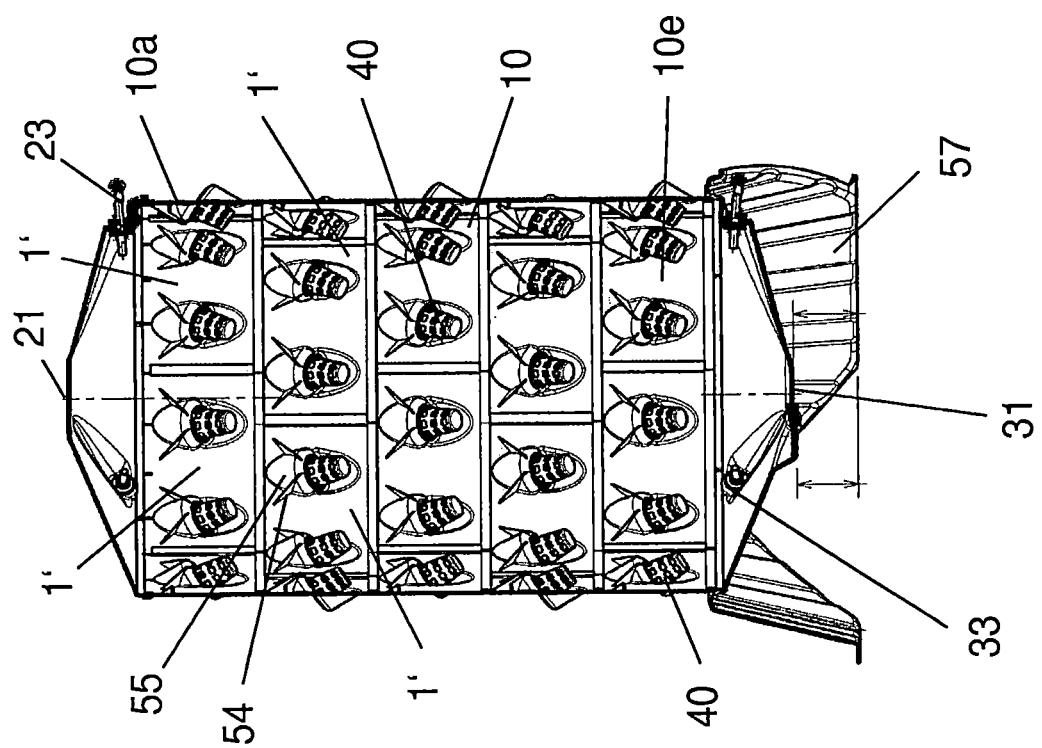

FIG. 5c shows a cross-section through the column element 100 of FIG. 5a along line A-A. This figure also clearly shows the guiding devices 54 which are arranged on the inner wall and guide water or nutrient solution to the planting baskets 40.

FIGS. 5a to 5c also show that the column element can be deployed in a standing position. For this purpose, a stand 57 is provided on the lower end of the column element 100. In the illustrated exemplified embodiment, the stand 57 has three feet 58 which are arranged distributed over the circumference. The stand 57 is formed in a circumferential manner and has a receptacle for the wall ring 10e. In the illustrated exemplified embodiment, the base part 30 is integrated into the stand 57.

Again, three ring hooks 23 and 33 which are used as fastening and guiding eyelets for tensioning elements, not illustrated, are each attached in the edge region of the lid part 20 and of the base part 30. The lid part 20 can be pulled towards the base part 30 by means of the tensioning elements. In this way, the structure of the column element 100 can be stabilised.

Figure 6:
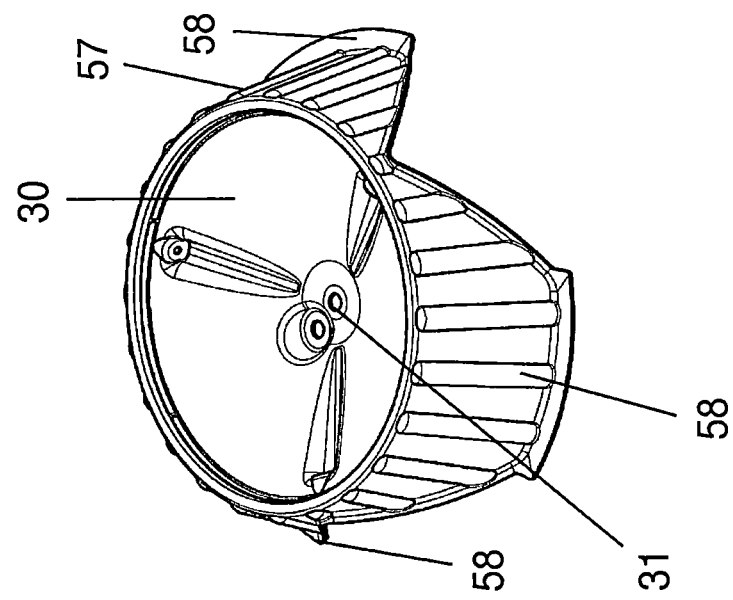
FIG. 6 shows a perspective view of a stand.

FIG. 6 shows a perspective view of the stand 57.

The invention claimed is:

1. A device for a vertical cultivation of plants which are nourished by wetting the roots with an aqueous nutrient solution, the device comprising:
   a column element having a modular structure adapted to be modularly constructed,
   wherein a wall of the column element has a plurality of planting openings formed therein, in which the plants can be positioned such that their roots grow into an interior of the column element;
   wherein the modular structure of the column element comprises a lid part, a base part and a plurality of wall rings between the lid part and the base part, wherein each wall ring is composed of a plurality of ring segments, in which the planting openings are formed, wherein the ring segments comprise a curved inner wall portion, a curved outer wall portion, wherein at least one of the ring segments comprises at least one of the planting openings, wherein the planting openings comprise an opening in the ring segment formed in an outward protrusion of the outer wall portion, wherein there is no enclosed space between the inner wall portion and outer wall portion of the ring segments, wherein each of the ring segments comprise a top edge, a bottom edge, a first side edge and a second side edge wherein the top edge is adapted to interconnect with the bottom edge of another ring segment, wherein the plurality of wall rings are arranged one on top of another wall ring such that the ring segments of a mutually adjoining wall ring are arranged offset with respect to one another, wherein the lid part is arranged on an end side on an uppermost wall ring and the base part is arranged on an end side on a lowermost wall ring, wherein the structure of the column element is fixed and stabilized with the aid of the lid part and the base part and without structural support internal to the wall rings; and
   a guiding device which guides the aqueous nutrient solution to the planting opening is provided on the inner wall portion of the ring segment, wherein the guiding device comprises a V-shaped projection which extends inwardly from the inner wall portion of the ring segment.

2. The column element according to claim 1, wherein the ring segments of the wall rings all have the same geometric dimensions.

3. The column element according to claim 1, wherein each ring segment has a lateral edge region wherein the each ring segment is connected to one another in the lateral edge region.

4. The column element according to claim 3, wherein the lateral edge regions of two adjacent ring segments are arranged in an overlapping manner and have holes, through which connection means, which fix the ring segments to one another, extend.

5. The column element according to claim 1, wherein one lateral edge of the ring segments is formed as a tongue element and the other lateral edge of the ring segments is formed as a receiving groove so that the ring segments are connected by means of grooved and tongued connections to form the wall ring.

6. The column element according to claim 1, wherein pin-like projections are formed in an edge region of the ring segments, said projections engaging into corresponding recesses in the edge region of an adjacent ring segment so that the ring segments of the wall ring are fixed with respect to one another in a vertical direction.

7. The column element according to claim 1, wherein the lower edge of the ring segments is stepped back with respect to its curved wall surface so that, when two wall rings are being fitted together, the lower edge of an upper wall ring engages behind an upper edge of a lower wall ring.

8. The column element according to claim 1, wherein projections and corresponding grooves for positioning and fixing respectively the ring segments or wall rings one above the other are formed in a lower and upper edge regions of the ring segments.

9. The column element according to claim 1, wherein the ring segment comprises a holder for a plant, wherein the holder comprises a first wall portion pointing obliquely inwards, and a second wall portion pointing obliquely outwards, wherein the planting opening is arranged between the first and second wall portions.

10. The column element according to claim 9, wherein the guiding device is arranged on an inner side of the first wall portion.

11. A device for a vertical cultivation of plants which are nourished by wetting the roots with an aqueous nutrient solution, the device comprising:
   a column element having a modular structure adapted to be modularly constructed,
   wherein a wall of the column element has a plurality of planting openings formed therein, in which plants can be positioned such that their roots grow into an interior of the column element;
   wherein the modular structure of the column element comprises a lid part, a base part and a plurality of wall rings between the lid part and the base part, wherein each wall ring is composed of a plurality of ring segments, in which the planting openings are formed, wherein the ring segments comprise a guiding device which guides the aqueous nutrient solution to the planting openings, wherein the guiding device is disposed on an inner wall portion of the ring segment, wherein the guiding device comprises two projections which extend inwardly from the inner wall portion of the ring segment and form an at least a partial V-shape, wherein the lid part is arranged on an end side on an uppermost wall ring and the base part is arranged on an end side on a lowermost wall ring, wherein the structure of the column element is fixed and stabilized with the aid of the lid part and the base part and without structural support internal to the wall rings.

* * * * *